US010795938B2

(12) United States Patent
Wan et al.

(10) Patent No.: US 10,795,938 B2
(45) Date of Patent: Oct. 6, 2020

(54) SPELL CHECKER

(71) Applicant: TARGET BRANDS, INC., Minneapolis, MN (US)

(72) Inventors: Howard Wan, Waltham, MA (US); Joe Gilbert, Minneapolis, MN (US); Alexander R. Arnold, Grosse Pointe Woods, MI (US); Steffie Rodrigues, Bangalore (IN); Priyabrata Kuanr, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 291 days.

(21) Appl. No.: 15/919,535

(22) Filed: Mar. 13, 2018

(65) Prior Publication Data
US 2018/0260406 A1    Sep. 13, 2018

Related U.S. Application Data

(60) Provisional application No. 62/470,597, filed on Mar. 13, 2017.

(51) Int. Cl.
*G06F 17/00*  (2019.01)
*G06F 16/9032* (2019.01)
(Continued)

(52) U.S. Cl.
CPC .. *G06F 16/90324* (2019.01); *G06F 16/24578* (2019.01); *G06F 16/90344* (2019.01); *G06F 16/9535* (2019.01); *G06F 40/232* (2020.01)

(58) Field of Classification Search
CPC ............ G06F 16/90324; G06F 40/232; G06F 16/9535; G06F 16/24578; G06F 16/90344
See application file for complete search history.

(56) References Cited

U.S. PATENT DOCUMENTS

| 6,853,982 B2 | 2/2005 | Smith et al. |
| 8,645,825 B1 | 2/2014 | Cornea et al. |

(Continued)

OTHER PUBLICATIONS

U.S. Non-final Office Action, issued in the U.S. Appl. No. 15/266,187, dated Jun. 14, 2018, 37 pages.
(Continued)

*Primary Examiner* — Tyler J Torgrimson
(74) *Attorney, Agent, or Firm* — Hamre, Schumann, Mueller & Larson, P.C.

(57) ABSTRACT

A computer-implemented method for correcting a spelling of a search term includes extracting search information from a clickstream database that includes search keywords received by a search engine. A server builds a database of acceptable terms that includes search keywords from the clickstream database that match a product in a product database. The server builds a database of correctable terms that include search keywords from the clickstream database that do not match a product in the product database. A plurality of spell correction candidates are identified based on the search keywords in the database of correctable terms. A confidence value for each of the plurality of spell correction candidates is determined. The spell correction candidate having a relatively highest confidence value among the confidence values for the plurality of spell correction candidates is stored in the database of correctable terms.

7 Claims, 7 Drawing Sheets

(51) Int. Cl.
*G06F 16/9535* (2019.01)
*G06F 16/2457* (2019.01)
*G06F 16/903* (2019.01)
*G06F 40/232* (2020.01)

(56) References Cited

U.S. PATENT DOCUMENTS

| | | | |
|---|---|---|---|
| 8,700,592 B2 | 4/2014 | Kanduri et al. | |
| 8,738,459 B2 | 5/2014 | Virdhagriswaran | |
| 8,983,995 B2 | 3/2015 | Hsu et al. | |
| 8,996,511 B2 | 3/2015 | Kelly | |
| 9,098,569 B1 | 8/2015 | Bhagat | |
| 9,135,559 B1 | 9/2015 | Chan et al. | |
| 9,230,223 B2 | 1/2016 | Cohen et al. | |
| 9,405,841 B2 | 8/2016 | Amacker et al. | |
| 10,169,711 B1 | 1/2019 | Dean | |
| 2005/0283468 A1 | 12/2005 | Kamvar et al. | |
| 2008/0120294 A1 | 5/2008 | Davis | |
| 2009/0083232 A1 | 3/2009 | Ives et al. | |
| 2009/0319521 A1* | 12/2009 | Groeneveld | G06F 16/951 |
| 2010/0306223 A1* | 12/2010 | Lee | G06F 16/24578 |
| | | | 707/759 |
| 2011/0295824 A1 | 12/2011 | Schneider | |
| 2012/0124071 A1 | 5/2012 | Genhard et al. | |
| 2012/0269116 A1 | 10/2012 | Xing et al. | |
| 2014/0122503 A1 | 5/2014 | Smith et al. | |
| 2014/0172627 A1 | 6/2014 | Levy et al. | |
| 2014/0181100 A1 | 6/2014 | Ramer et al. | |
| 2014/0280000 A1 | 9/2014 | Subramanian Karthik | |
| 2015/0120386 A1 | 4/2015 | Sherman et al. | |
| 2015/0205866 A1* | 7/2015 | Shaw | G06F 16/951 |
| | | | 707/729 |
| 2015/0310526 A1 | 10/2015 | Warren et al. | |
| 2015/0339754 A1 | 11/2015 | Bloem et al. | |
| 2016/0005098 A1 | 1/2016 | Flynn et al. | |
| 2016/0012511 A1 | 1/2016 | Braziunas et al. | |
| 2016/0019213 A1 | 1/2016 | Carmel et al. | |
| 2016/0188708 A1 | 6/2016 | Glover et al. | |
| 2016/0283580 A1 | 9/2016 | Amacker et al. | |
| 2016/0321727 A1 | 11/2016 | Levin | |
| 2016/0328459 A1 | 11/2016 | Somaiya et al. | |
| 2016/0328787 A1 | 11/2016 | Szulczewski et al. | |
| 2017/0185670 A1 | 6/2017 | Dua et al. | |
| 2017/0221126 A1 | 8/2017 | Leong et al. | |
| 2017/0308557 A1 | 10/2017 | Cassidy et al. | |
| 2017/0357733 A1 | 12/2017 | Lobo et al. | |
| 2018/0032997 A1 | 2/2018 | Gordon et al. | |
| 2018/0046703 A1 | 2/2018 | Lavie et al. | |

OTHER PUBLICATIONS

U.S. Final Office Action, issued in the U.S. Appl. No. 15/266,187, dated Nov. 30, 2018, 18 pages.
U.S. Non-final Office Action, issued in the U.S. Appl. No. 15/266,187, dated Mar. 21, 2019, 19 pages.
Notice of Allowance, issued in the U.S. Appl. No. 15/266,187, dated Jan. 30, 2020, 18 pages.

* cited by examiner

US 10,795,938 B2

SPELL CHECKER

FIELD

This disclosure relates generally to electronic search processing. More specifically, this disclosure relates to systems and methods for checking spelling of an input search term when processing an electronic search.

BACKGROUND

Consumers purchase products in retail stores and via retail websites accessible from the Internet. Shopping via a retail website allows consumers to interact with text, pictures, videos, and/or audio clips relating to the products the consumer is contemplating purchasing. Often, shopping via the retail website allows the consumer to read reviews by other consumers, search for related products, and search for products that other consumers bought at the same time, or the like. In some instances, the inventory of products available from a retailer through the retail website can be different from the products available at the retail store.

Improved ways to enhance a consumer's shopping experience are desirable.

SUMMARY

This disclosure relates generally to electronic search processing. More specifically, this disclosure relates to systems and methods for checking spelling of an input search term when processing an electronic search.

For example, a computer-implemented method for correcting a spelling of a search term is disclosed. The method includes extracting search information from a clickstream database, the clickstream database including search keywords which have been received by a search engine. A database of acceptable terms is built by a server. The database of acceptable terms includes search keywords from the clickstream database that match a product in a product database. A database of correctable terms is built by the server. The database of correctable terms includes search keywords from the clickstream database that do not match a product in the product database. A plurality of spell correction candidates are identified based on the search keywords included in the database of correctable terms. A confidence value is determined for each of the plurality of spell correction candidates. One of the plurality of spell correction candidates is stored in the database of correctable terms. The one of the plurality of spell correction candidates being stored has a relatively highest confidence value among the confidence values for each of the plurality of spell correction candidates.

A spell check system is also disclosed. The system includes a server that includes a spell check builder that generates first and second databases that store one or more search keywords. A spell checker, in response to receiving a search input from a user device, identifies whether the search input is in the first or the second database. The server provides a search results list based on the search input.

A spell checker is also disclosed. The spell checker includes a spell check building means that generates a plurality of databases that store one or more keywords and statistical information associated with the one or more keywords. The plurality of databases includes a database of acceptable terms including keywords which are also present in a product database and a database of correctable terms including keywords which are not present in the product database. The statistical information in the database of correctable terms includes a spelling correction, a confidence value, and an action indicator.

A computer-implemented method for correcting a spelling of a search term is also disclosed. The method includes extracting search information from a clickstream database, the clickstream database including search keywords which have been received by a search engine. A server compares each of the search keywords as extracted with product information in a product database to identify matching search keywords and non-matching search keywords. The matching search keywords are stored in a database of acceptable terms and the non-matching search keywords are stored in a database of correctable terms. The server calculates a ranking score for each of the matching search keywords in the database of acceptable terms. The ranking score is based on a weighting of actions performed for the matching search keywords in the clickstream database. For each of the non-matching search keywords in the database of correctable terms, the server identifies a plurality of spell correction candidates. For each of the plurality of spell correction candidates as identified, the server determines whether a respective spell correction candidate of the plurality of spell correction candidates is in the database of acceptable terms. In response to determining the respective spell correction candidate is in the database of acceptable terms, the server determines a confidence value for the respective spell correction candidate. The confidence value is determined based on a weighting including the ranking score in the database of acceptable terms of the respective spell correction candidate, a length of the respective spell correction candidate, an edit distance of the respective spell correction candidate, and a value representative of a type of edit performed to obtain the respective spell correction candidate. The server stores one of the plurality of spell correction candidates in the database of correctable terms. The one of the plurality of spell correction candidates being stored has a relatively highest confidence value among the confidence values for the plurality of spell correction candidates.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1:
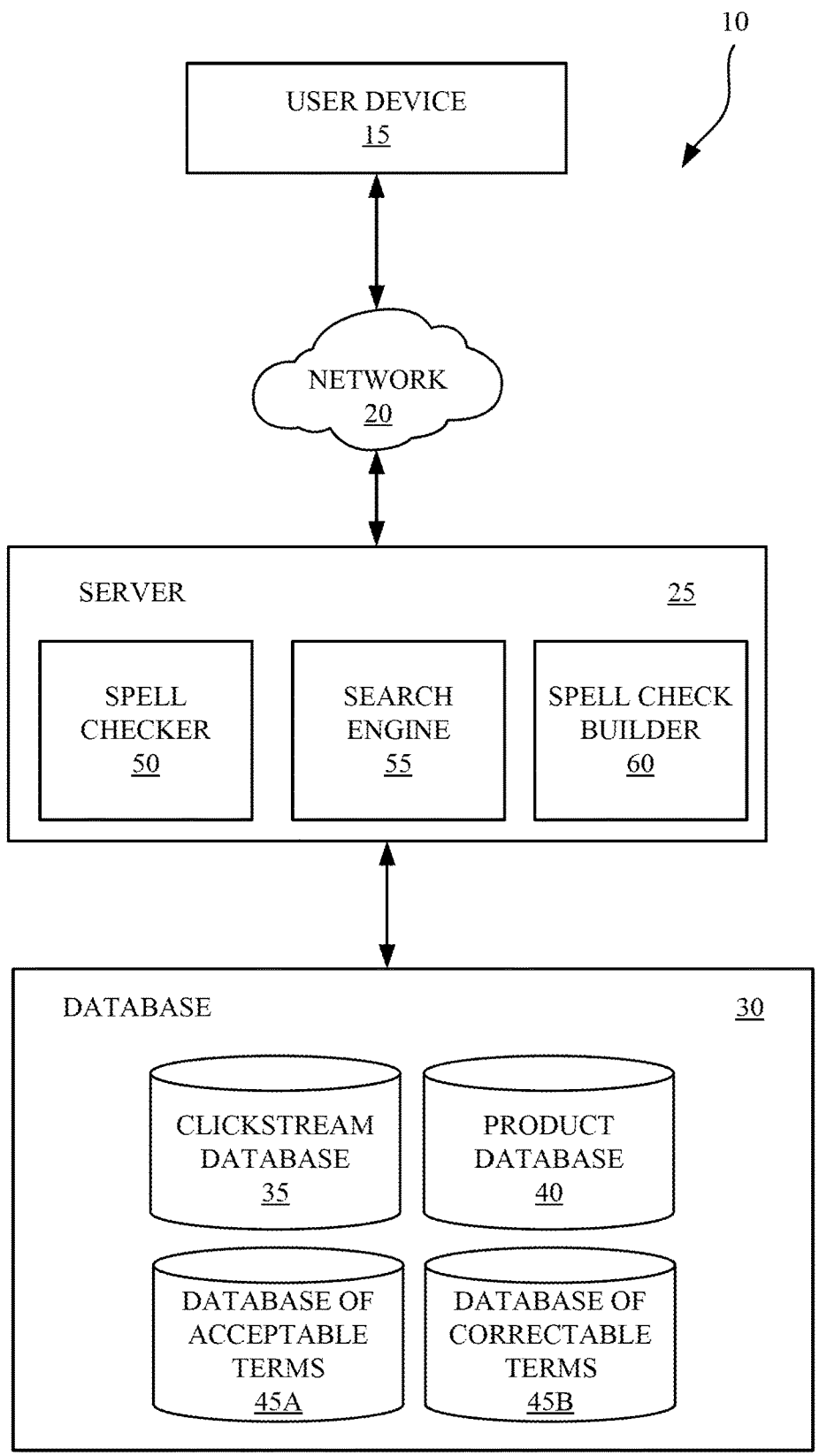
FIG. 1 is a schematic diagram of a system for implementing the spell checker and methods described in this specification, according to an embodiment.

A retail website can include an electronic search engine ("search engine"). A search engine generally refers to a software system that enables electronic searching of information in one or more particular locations such as, but not limited to, the Internet, a database, a plurality of databases, or the like. For example, a search engine for a retail website can be used by a user of the retail website to search through an inventory of products that are available from the retailer (e.g., one or more products that are available for purchase via the website, in a retail store of the retailer, or a combination thereof, etc.). When the user performs a search using the search engine, the user's search is often referred to as the user's search or the user's query. The terms included in the search may be referred to as the keywords of the search or the keywords of the query.

The search engine can be part of an electronic search system ("search system"). The search system can include, for example, a search input (e.g., a text box, etc.) displayed on the retail website, an electronic spell checker ("spell checker"), and the search engine. The search system can include one or more other features such as, but not limited to, an electronic search term predictor ("search term predictor"), or the like. The spell checker can, in an embodiment, provide a modified search term to the search engine in response to identifying a spelling or other input error by the user. The search engine can return search results electronically to the user (e.g., for display on a display of a computer device) based on the modified search term, according to an embodiment. The spell checker can include one or more spell correction dictionaries which can be used to identify misspellings and provide spelling corrections.

An electronic search (or search), as used in this specification, generally includes one or more keywords which are input into a search input of a search engine.

In a search engine for a retail website (e.g., an e-commerce search engine), a spell checker can be used to, for example, identify one or more spelling errors in a user's search based on a plurality of characters input by the user of the retail website. The spell checker can, for example, increase an accuracy of the search results provided to the user. In an embodiment, the increased accuracy can lead to a higher rate of users whose searches are converted to purchases of one or more products from the retailer.

Clickstream data, as used herein, generally includes a series of selections made by a user when browsing a website or software application. For example, in an embodiment, clickstream data can include a search term input by a user, and information indicating what type of action the user took in response to the search results received. Actions can include, for example, a selection to view more information about a product; a selection to add a product to the user's electronic shopping cart; and/or a selection to purchase a product.

Edit distance, as used herein, is a quantification of a difference between two strings of characters. The edit distance can include a plurality of edit operations, each having a different quantitative impact on the edit distance. Edit operations include, but are not limited to, appending an ending "s;" deleting an ending "s;" inserting an apostrophe; deleting an apostrophe; fusing two words together; separating one word into two; replacing with an adjacent character; replacing with a non-adjacent character; transposing two characters; deleting one character; inserting one character adjacent to itself; deleting one character adjacent to itself; a penalty for replacing a first character; and a penalty for a number of edits overall.

FIG. 1 is a schematic diagram of a system 10 for implementing the spell checker system and methods described in this specification, according to an embodiment. The system 10 can be used to build a spell check database and/or to provide a spelling correction based on a plurality of characters received from a search input by a user of a website (e.g., a retail website of a retailer, an application for a mobile device, etc.).

The system 10 includes a server 25 in communication with a user device 15 via a network 20. The server 25 can make a spell checker 50 available to the user device 15. The server 25 can make the spell checker 50 available to the user device 15 via the network 20. In an embodiment, the server 25 can make a graphical user interface (GUI) for performing a search of a product database (e.g., product database 40 described below) available from a retailer (e.g., via the retailer's website or via the retailer's store in instances in which the retailer also has a retail store) available to the user device 15 via the network 20. It will be appreciated that the GUI may be made available by one or more servers that are separate from the server 25. In an embodiment, aspects of the server 25 can be the same as or similar to aspects of the server device 535 as shown and described in accordance with FIG. 7 below.

In an embodiment, the network 20 is representative of the Internet. In an embodiment, the network 20 can include, for example, a local area network (LAN), a wide area network (WAN), a wireless network, a cellular data network, or the like. In an embodiment, aspects of the network 20 can be the same as or similar to aspects of the network 540 as shown and described in accordance with FIG. 7 below.

The user can search an inventory of products available for purchase from a retailer (e.g., either from the retailer's website or for pickup from the retailer's store) via the user device 15. Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. The user device 15 generally includes a display device and an input device. A GUI for searching the inventory of products available for purchase from the retailer can be displayed on the display device of the user device 15. Examples of the display device for the user device 15 include, but are not limited to, a monitor connected to a PC, a laptop screen, a mobile device screen, a tablet screen, or the like. In an embodiment, aspects of the user device 15 can be the same as, or similar to, aspects of user devices 501 as shown and described in accordance with FIG. 7 below.

The server 25 is in communication with a database 30. The database 30 generally includes a variety of information on click and sales data from a retailer, such as the clickstream database 35. The clickstream database 35 can include click and sales data such as, but not limited to, a listing of searches performed by users of the website, along with clicks the users performed in response to those searches (e.g., which products the users clicked on from the search results, etc.), whether the users added any products from the search results to a shopping cart for purchase, and which product(s) the users ultimately added to the shopping cart for purchase. The clickstream database 35 can include the click and sales data for a particular period of time. For example, in an embodiment, the clickstream database 35 can include click and sales data for the previous calendar year. The amount of click and sales data in the clickstream database 35 can vary. The amount of click and sales data (e.g., number of entries, time period of data, etc.) can contribute to an accuracy of the spell checker 50.

The database 30 can include a variety of information on products available from the retailer, such as product database 40. In an embodiment, the products included in the product database 40 may be those products that are available for purchase from the retailer, including products that are available through the retailer's website or in a retail store of the retailer.

The database 30 can include a database of acceptable terms 45A ("database 45A"). The database 45A can include a listing of keywords which have been searched by users and which have been identified as being in the product database 40. That is, entries in the database 45A should also be present in the product database 40. The database 45A can include additional information such as, but not limited to, statistical information which can include, for example, a frequency of which the keyword has been queried, and/or a ranking score for the keyword. The ranking score can, for example, be an indicator of how often the keyword results in a positive action (e.g., a click, a cart add, a purchase, etc.) for the retailer. The statistical information including the ranking score and the frequency can be determined based on the information in the clickstream database 35.

The database 30 can include a database of correctable terms 45B ("database 45B"). The database 45B can include a listing of keywords which have been searched by users and which have been identified as not being in the product database 40. That is, entries in the database 45B should not be present in the product database 40. The database 45B can include additional information such as, but not limited to, a spell checker correction, statistical information (e.g., a ranking score, an edit distance, etc.), and an action indicator.

The database 30 can include additional information such as, but not limited to, a user history database, a session history database, or the like. It is to be appreciated that the databases 35-45 can be combined and that a structure of the database 30 is not intended to be limited to the illustrated embodiment. In an embodiment, the databases 45A, 45B can be created, for example, based on information that is available in the clickstream database 35 and the product database 40. In an embodiment, the databases 45A, 45B can be created and/or updated on a periodic basis such as, but not limited to, daily, weekly, etc.

The server 25 includes a spell check means, a search engine 55, and a spell check building means. In an embodiment, the spell check means includes spell checker 50. In an embodiment, the spell check building means includes spell check builder 60. The server 25 can include fewer or additional aspects. For example, the server 25 can include a GUI builder. In an embodiment, the server 25 can include one or more search processing features, such as, but not limited to, a search classifier, a search term prediction means, or the like.

The spell check building means (e.g., spell check builder 60) can, for example, use information from the database 30 to build the databases 45A, 45B. The building of the databases 45A, 45B is discussed in further detail in accordance with FIGS. 2 and 3 below. In an embodiment, the spell check builder 60 can extract data from the clickstream database 35, compare the extracted data with data in the product database 40, and separately include portions of the data in the databases 45A, 45B. Additionally, the spell check builder 60 can determine term frequency, ranking scores, spell checker corrections, or the like.

The spell check builder 60 can build the databases 45A, 45B on a periodic basis. For example, the spell check builder 60 can extract the data on a weekly basis, daily basis, hourly basis, etc. In an embodiment, a daily basis may be preferred to provide a relatively more accurate spell checker correction.

The search engine 55 can be used to determine search results for a particular search. The search engine 55 can be provided with the user's search in the same manner as the search was input. For example, if a user searches for "green apples," the search engine 55 may be provided with a search "green apples" and return all products satisfying the search as a search results list. In an embodiment, the search engine 55 may be provided with a corrected search. For example, if the user searches for "grean apples" the search engine 55 may be provided with a search "green apples" based on an input from the spell checker 50.

Figure 2:
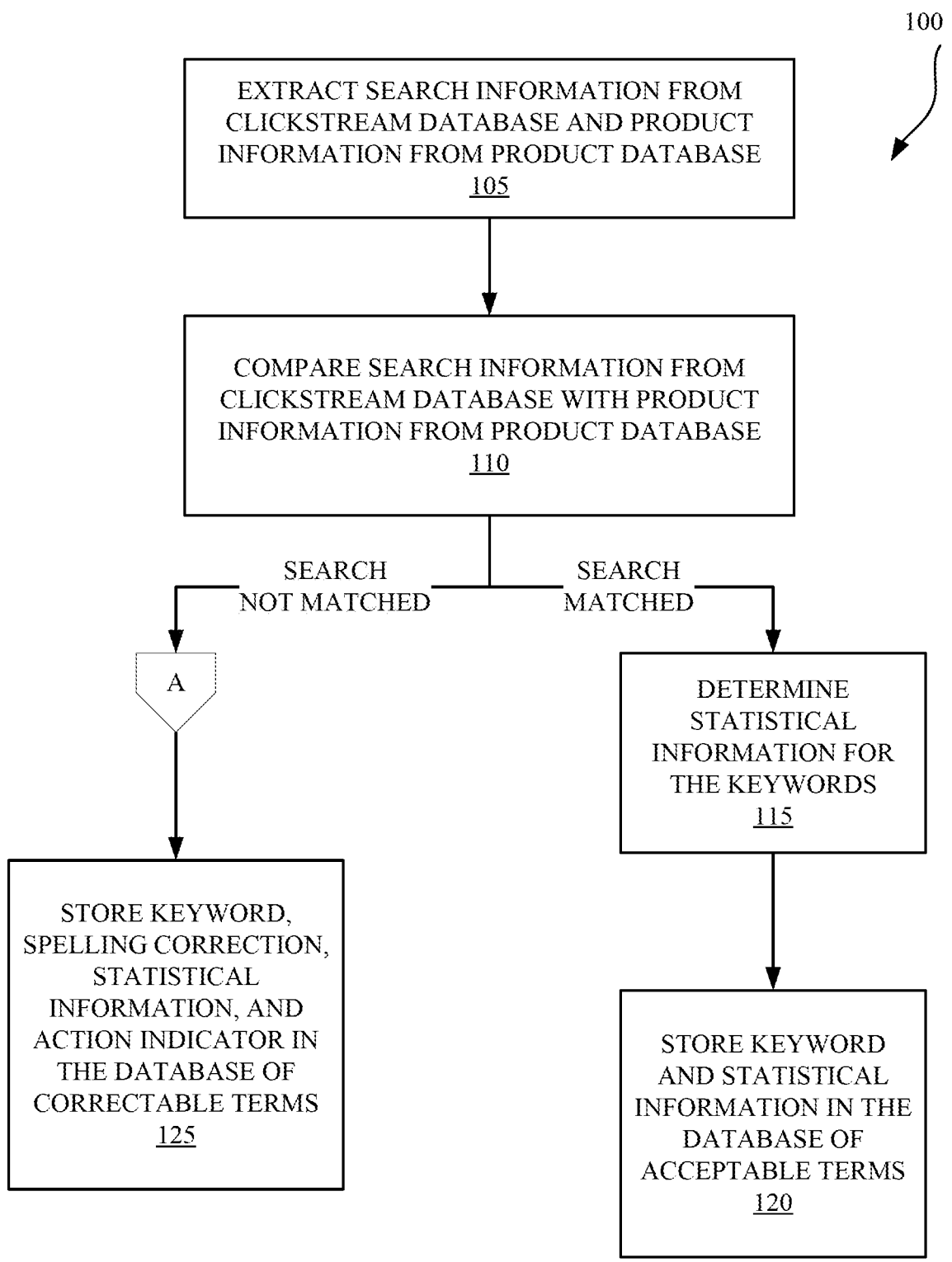
FIG. 2 is a flowchart of a method for creating a database of acceptable terms and a database of correctable terms, according to an embodiment.

FIG. 2 is a flowchart of a method 100 for creating databases 45A, 45B (FIG. 1), according to an embodiment. In an embodiment, the method 100 can provide the databases 45A, 45B for use by the spell checker 50 (FIG. 1) to selectively correct a spelling of a search input by a user via an input device of the user device 15 (FIG. 1).

At 105, the server 25 (e.g., the spell check builder 60 (FIG. 1)) extracts search information from the clickstream database 35 (FIG. 1). In an embodiment, the spell check builder 60 can extract a subset of data that is stored in the clickstream database 35. For example, in an embodiment in which the clickstream database 35 includes search information for the past one year, the spell check builder 60 can extract information from the clickstream database 35 that is less than one year. In an embodiment, the spell check builder 60 can extract search information from the clickstream database 35 for a period of time that includes the previous 180 days (e.g., six months). The period of time can vary beyond the stated value. For example, in an embodiment, the period of time can be less than six months. In another embodiment, the period of time can be greater than six months. In an embodiment, the spell check builder 60 can extract information from the clickstream database 35 that is more recent than the last time the spell check builder 60 extracted information from the clickstream database 35. For example, if the spell check builder 60 extracts data from the clickstream database 35 on a daily basis, the spell check builder 60 can extract the previous one day's worth of data after the initial extraction of the previous one year's worth of data.

In an embodiment, the extraction of information can also include a modification of the search information. For example, special characters such as apostrophes, quotation marks, etc., can be removed from text. Special characters (e.g., periods, commas, colons, semicolons, equal signs, tildes, hyphens, etc.) at a beginning or end of the search can be removed. Search keywords which are too long (e.g., more than eight characters) and/or search keywords which are too short (e.g., fewer than 4 characters) can be removed from the search information. Double spaces can be edited to be a single space. Leading or trailing spaces can be removed. Searches having only numbers, special characters, and/or Uniform Resource Locators (URLs) can be removed from the search information. Duplicate searches can be combined (e.g., the click and sales data can be added).

At 110, the spell check builder 60 compares the search information in the clickstream database 35 to the product information in the product database 40. In performing this comparison, a search may be tokenized (e.g., broken up into words) and each token may be searched in the product database 40. In an embodiment, if even one token is not present in the product database 40, then a match is not found.

In an embodiment, words such as "a," "the," or the like may be ignore when completing the comparison.

If a search keyword in the clickstream database 35 matches a product in the product database 40, statistical information for the search keyword is determined at 115 by the spell check builder 60. Statistical information can include, for example, a determination of a frequency of the search term in the clickstream database 35. Statistical information for the search keyword can also include, for example, a ranking score that is representative of actions the users are taking in response to the search. For example, the ranking score can be a score that can be compared to other queries which is based on whether the user completed a search and took no further action, completed a search and clicked on a product, completed a search and added a product to the user's cart, and/or completed a search and completed a purchase of a product. The ranking score can be additionally based on how recently the search keyword was searched (relative to a date on which the search information was extracted from the clickstream database 35). For example, a recent search may be weighted relatively more significantly in determining the ranking score than a search completed relatively less recently. At 120 the search keyword and statistical information are stored in the database 45A.

Figure 3:
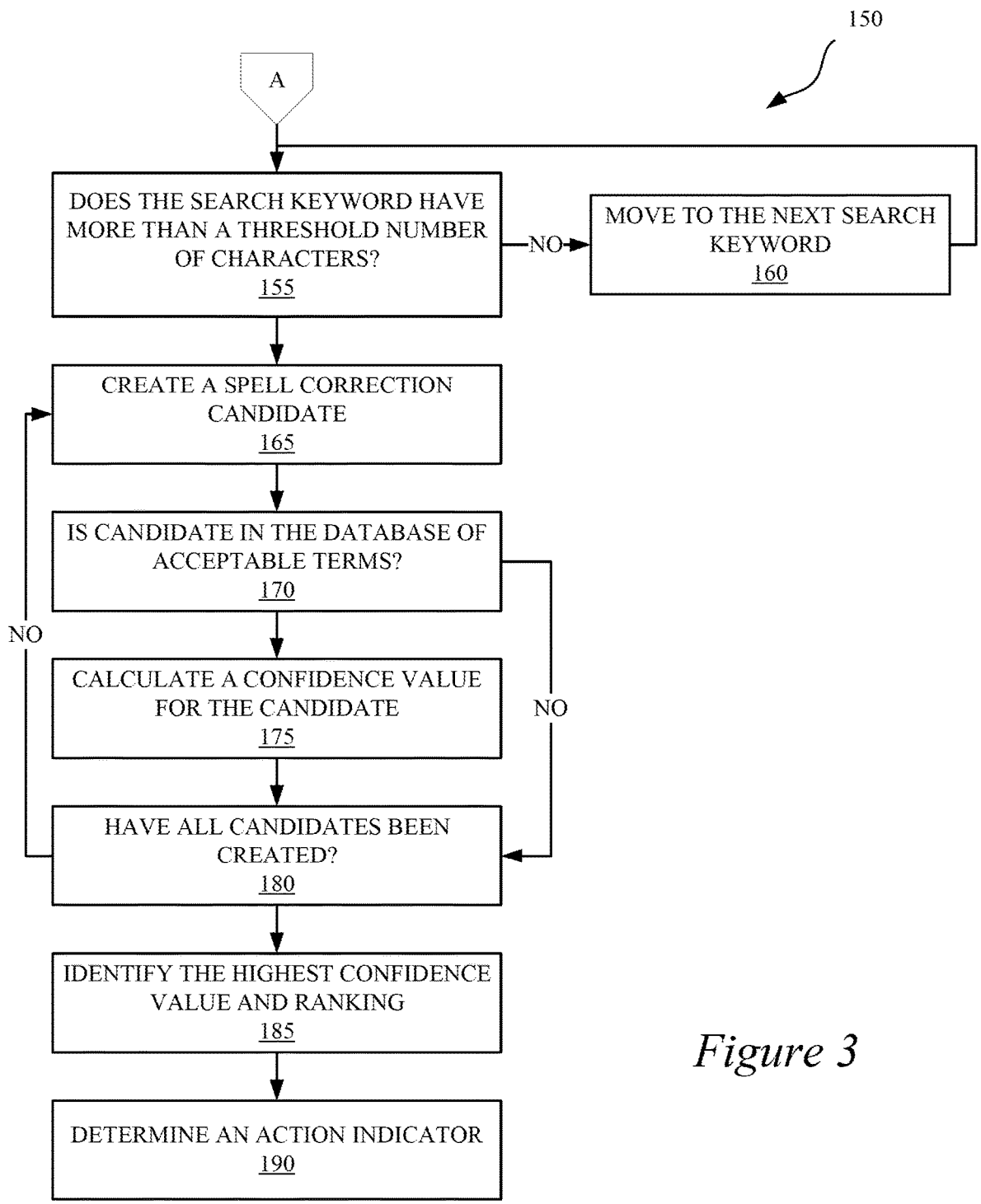
FIG. 3 is a flowchart of a method for creating a spell correction, statistical information, and an action indicator for search keywords to be stored in the database of correctable terms, according to an embodiment.

If the search keyword does not match an entry in the product database 40, the search keyword can be stored in the database 45B at 125. Prior to storing the keyword in the database 45B, the method 150 as shown in FIG. 3 is performed. The method 150 results in a spell correction, statistical information, and an action indicator, which are also stored with the search keyword at 125.

In an embodiment, the method 100 can be run on a periodic basis such as, but not limited to, a daily basis, or the like.

FIG. 3 is a flowchart of the method 150 for creating a spell correction, statistical information, and an action indicator for search keywords to be stored in the database 45B, according to an embodiment. As discussed above, the method 150 can generally be executed for a search keyword that is identified as not being present in the product database 40.

At 155, the spell check builder 60 determines whether the search keyword includes a number of characters that is greater than a threshold. The threshold can represent a minimum number of characters for the spell check builder 60 to determine statistical information and a spell correction. In an embodiment, the threshold number of characters can be, for example, four characters. It is to be appreciated that he threshold can be a number other than four characters. If at 155, the search keyword includes fewer characters than the threshold, at 160 the spell check builder 60 can move on to the next search keyword identified as not matching a product in the product database 40 without further action on the current search keyword.

If the search keyword includes a number of characters that is greater than the threshold, then a spell correction candidate is created at 165. The spell correction candidate can be formed by modifying up to a maximum number of characters in the search keyword. In an embodiment, the maximum number of characters can be, for example, two characters. In an embodiment, modifying more than two characters may cause a risk of correcting spelling of a user's search with a term that was not intended by the user. The spell correction candidate, for example, can be formed by modifying characters in the search keyword. For example, if the search keyword is "dipers," the spell check builder 60 can begin by suggesting "dapers" then "dbpers," etc. At 170, once a spell correction candidate has been formed, the spell check builder 60 can determine whether the spell correction candidate is in the database 45A. If the spell correction candidate is not in the database 45A, indicating that the spell correction candidate is not a suitable spell correction, the spell check builder 60 determines whether all spell correction candidates have been created at 180. In an embodiment, a flag or other indicator may be set once all spell correction candidates up to a modification of the maximum number of characters has been created.

If the spell check correction candidate is in the database 45A, then statistical information about the spell correction candidate can be determined at 175. At 175, the statistical information can include a confidence determination for the spell correction candidate. The confidence determination can be representative of how likely the spell correction candidate is to be a suitable spell correction that appropriately captures intent of a user. The confidence determination can include determining a value that represents how valuable the spell correction candidate is relative to how different the spell correction candidate is relative to the search keyword. The value representing how valuable the spell correction candidate is may be based on the statistical information stored in the database 45A. For example, if the spell correction candidate has a relatively higher ranking score and a relatively higher frequency, the spell correction candidate may be considered to be more valuable. In this context, how valuable a spell correction candidate is may be representative of how often the spell correction candidate is being searched by users of the website, and whether the search is resulting in positive actions (e.g., cart adds, purchases, etc.). The value of the spell correction candidate may also be based on a length of the spell correction candidate. In an embodiment, relatively longer (e.g., relatively higher number of characters) spell correction candidates can result in a higher confidence determination.

The determination as to how different the spell correction candidate is relative to the search keyword can be based on, for example, an edit distance for the spell correction candidate. Further, the determination as to how different the spell correction candidate is relative to the search keyword can also be based on a weighting factor that is determined according to the type of edit required. For example, in the "diper" example, the type of edit required is insertion of one character to result in "diaper." If the search keyword were "dieper," the type of edit would be replacement of one character to result in "diaper." In an embodiment, the confidence determination can be normalized so that a confidence value is between, for example, 0 and 1. A weighting corresponding to the type of edit can be optimized to, for example, rank edits according to their likelihood of being correct. In another example, a search may be input as "outdoor eamp." Possible spelling corrections can include, for example, "outdoor lamp," "outdoor ramp," or the like. In such a case, edit distance can be used to more accurately predict the intent of the user. In such a situation, it may be more likely that the user intended to enter "outdoor ramp," as the character "e" is closer in proximity on a keyboard relative to the character "l." Thus the confidence determination can be relatively higher for "outdoor ramp" than "outdoor lamp." As a result, using the edit distance, the spell checker can provide "outdoor ramp" instead of "outdoor lamp."

Once all spell correction candidates have been determined for the search keyword, a spell correction candidate with a relatively highest confidence value and ranking score (in database 45A) is determined at 185. The ranking can serve as a tie-breaker in cases where a confidence value between two spell correction candidates is the same.

At 190, the spell check builder 60 compares the confidence value of the selected spell correction candidate with a threshold for determining an action to be taken if the search keyword is entered. The threshold can include several ranges, depending on what actions are to be taken. For example, if the confidence value is greater than a high end of the threshold range, the action may indicate that a spell correction should be made if the search keyword is input by a user. If the confidence value is between a lower end of the threshold range and the high end of the threshold range, the action may be to suggest the spell correction as an alternative, but do not correct the search keyword. If the confidence value is below the lower end of the threshold range, the action may be to do nothing if the search keyword is input.

Figure 4:
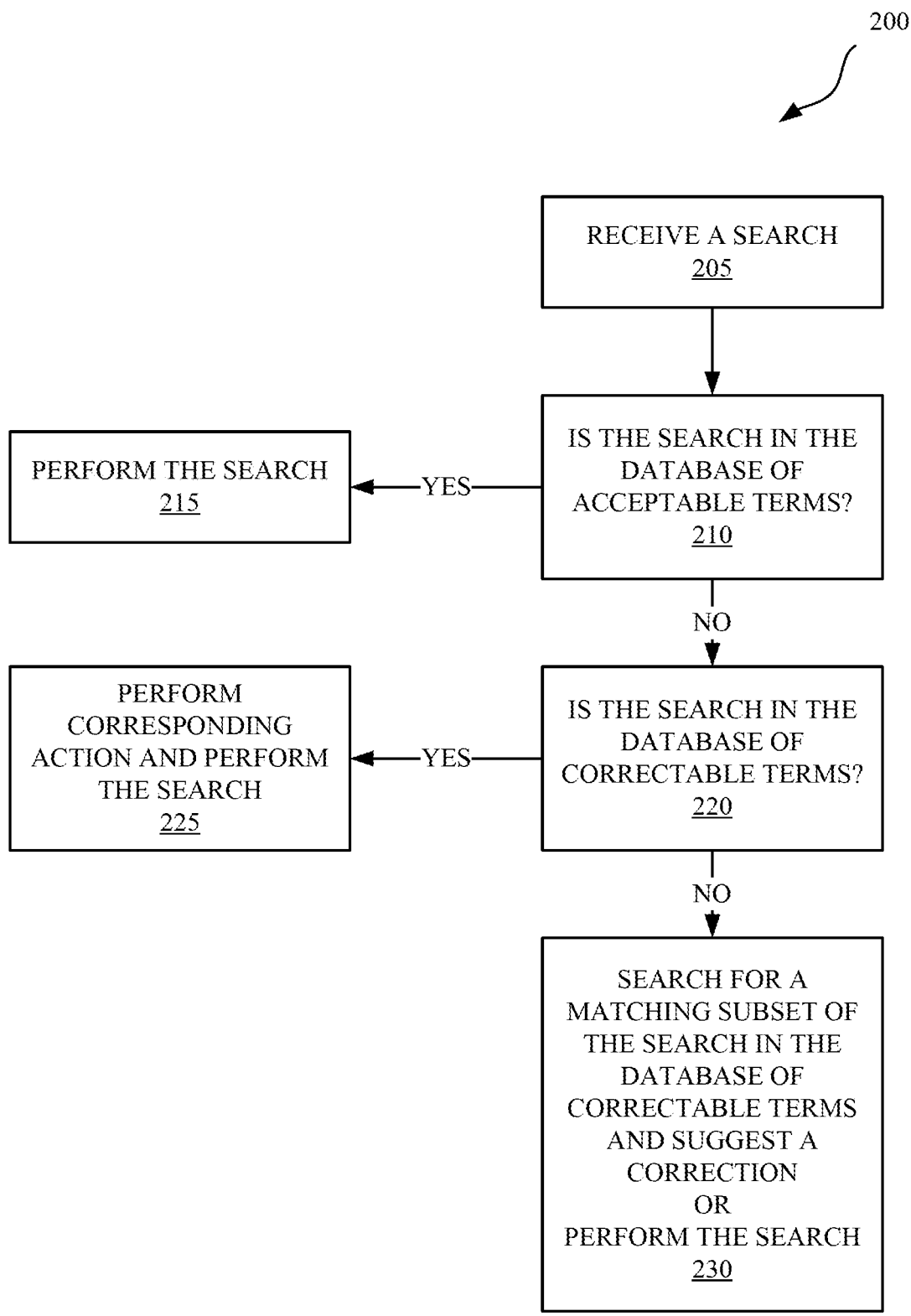
FIG. 4 is a flowchart of a method for determining a spelling correction, according to an embodiment.

FIG. 4 is a flowchart of a method 200 for determining a spelling correction, according to an embodiment.

At 205, a search is received by the server 25 from the user device 15. At 210, the search keyword is searched by the spell checker 50 in the database 45A (FIG. 1). If the search keyword is found in the database 45A, the search is performed by the search engine 55 and search results are provided to the user at 215.

If the search keyword is not found in the database 45A, the search keyword is searched by the spell checker 50 in the database 45B at 220. If the search keyword is found in the database 45B, then the spell checker 50 performs an action according to the action indicator in the database 45B and performs the search by the search engine 55 at 225.

If at 220 the search keyword is not found in the database 45B, at 230, a search for a matching subset of the search in the database 45B may be performed, and a corresponding match can be provided for display on the user device 15 as a suggested search term. Alternatively, at 230, the spell checker 50 can do nothing and perform the search by the search engine 55. In an embodiment, because the database 45B is created on a periodic basis (e.g., daily, weekly, etc.), the search keyword which is not found in the database 45B will be identifiable in the database 45B if the search keyword is input after the database 45B is created again. For example, if the search entered is "blue toy superhero playset," a match may not be found in the database of correctable terms. However, if "superhero playset" is in the database of correctable terms, then a suggestion to "superhero playset" may be provided.

Figure 5:
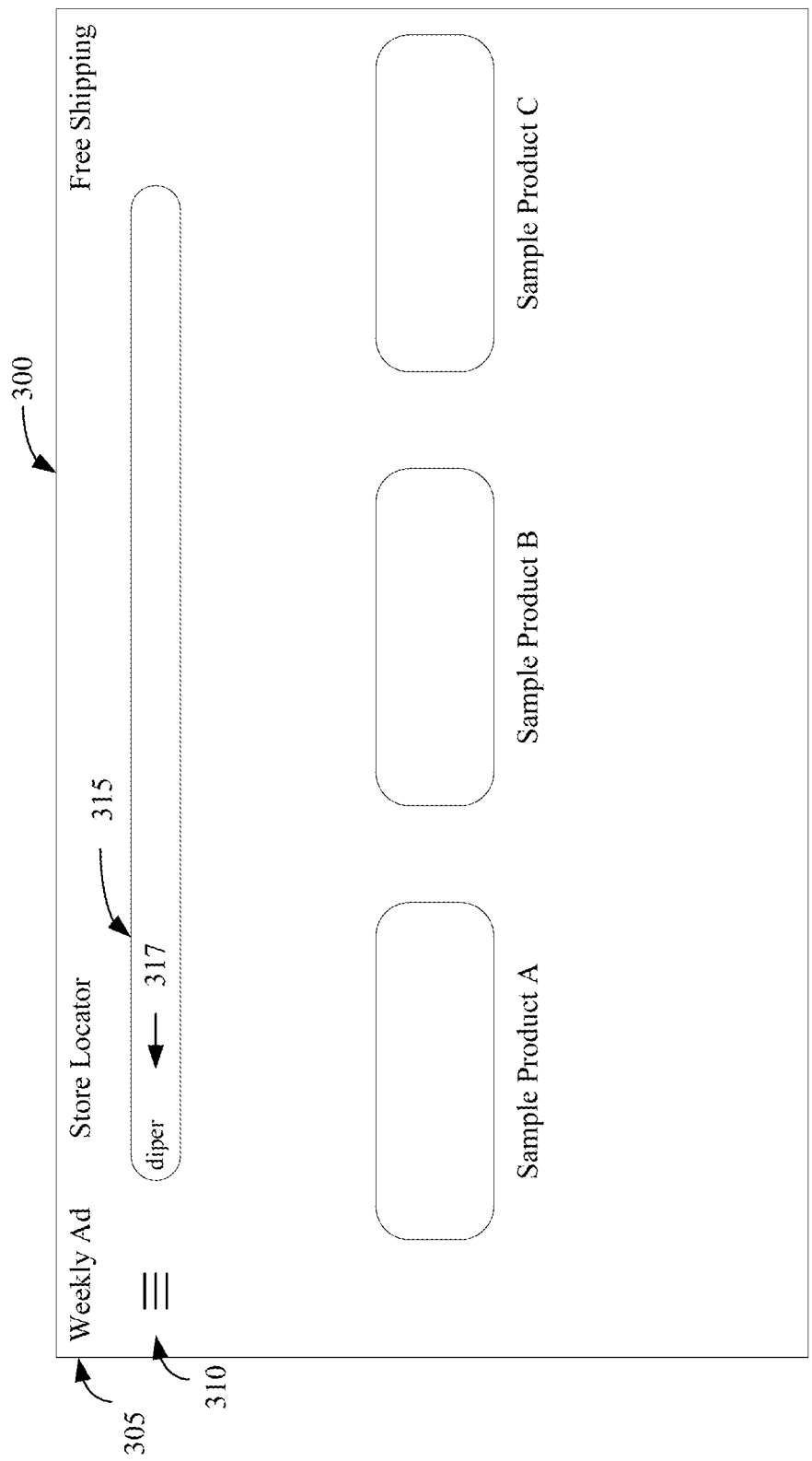
FIG. 5 is a graphical user interface (GUI) of a retail website displaying a search input, according to an embodiment.

FIG. 5 is a GUI 300 of a retail website displaying a search input, according to an embodiment. The GUI 300 is an example of the retail website and can include additional or less information than shown in FIG. 5. It will be appreciated that the text is representative and can be modified. The GUI 300 includes a header 305, a menu 310, and a search input 315.

The header 305 can, for example, include one or more hyperlinks or other text which a user can click to navigate to different pages of the retail website, according to an embodiment. In an embodiment, the header 305 can include one or more promotional messages such as, but not limited to, "Free Shipping," or the like. The menu 310 can be a clickable image which in response to being selected can display a list of options to the user. For example, clicking on the menu 310 can cause a number of categories (e.g., electronics, houseware, clothing, etc.) to display, navigational options, or the like.

The search input 315 is an input into which a user can input a search term. In the illustrated embodiment, a search term 317 including the keyword "diper" has been input for illustrative purposes.

Figure 6:
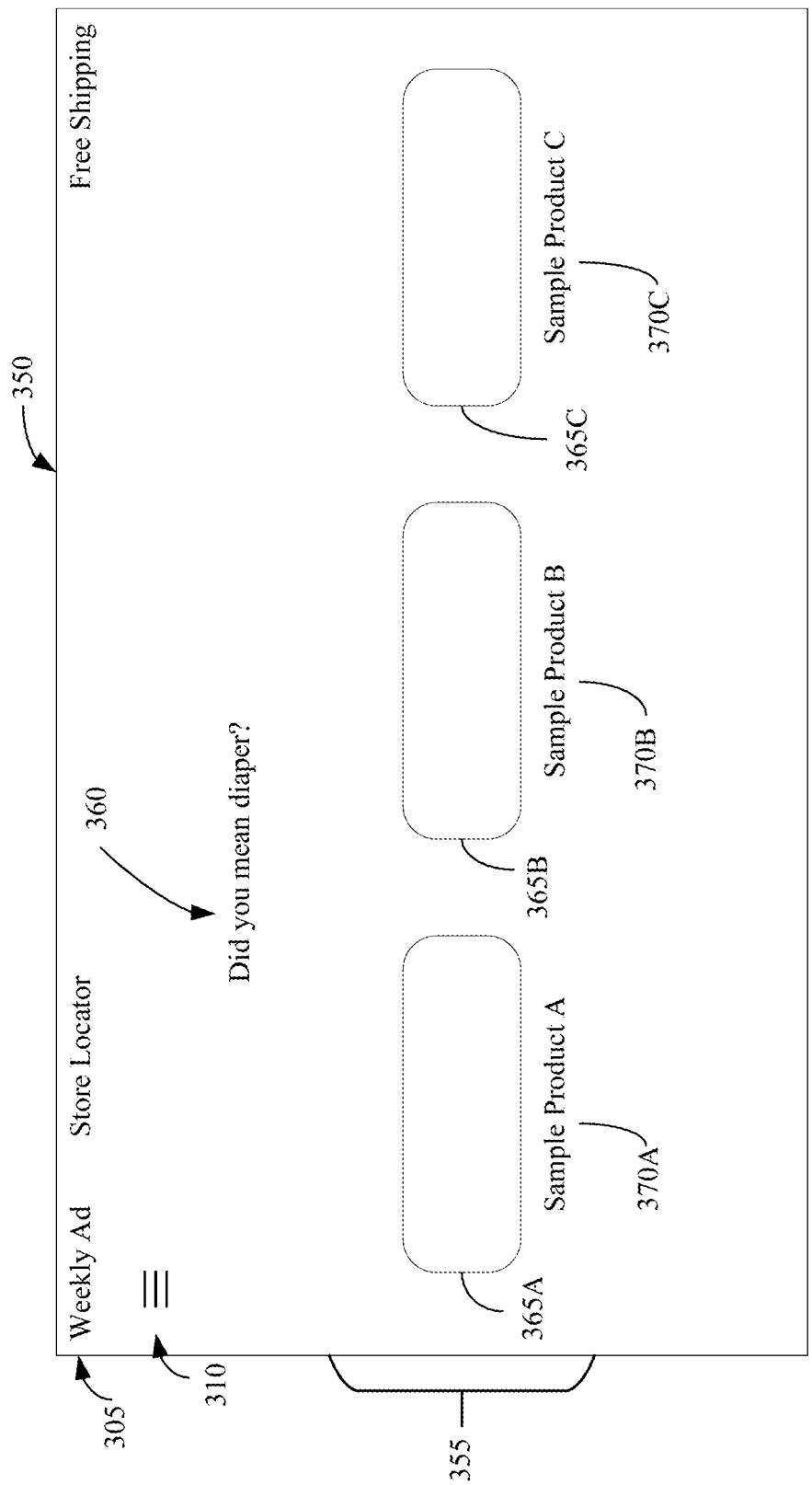
FIG. 6 is a GUI of a retail website displaying a search results list, according to an embodiment.

FIG. 6 is a GUI 350 of a retail website displaying a search results list, according to an embodiment. The GUI 350 is an example of the retail website and can include additional or less information than shown in FIG. 6. For simplicity of this specification, features described with respect to GUI 300 will not be described in further detail.

The GUI 350 includes a search results list 355 and a search suggestion 360. In an embodiment, the search results list 355 is based on the search keyword entered into the search input 315 (FIG. 5). In an embodiment, the search results list is based on a spell correction as determined from the spell checker 50 (see FIG. 4 above). In an embodiment, the search results list 355 is based on the search keyword and the search suggestion 360 is provided on the display of the user device 15.

The GUI 350 also includes a plurality of products 365A-365C and product labels 370A-370C which are generally representative of products available for purchase from the retailer (either via the website or in the retail store). In an embodiment, the products 365A-365C and product labels 370A-370C can alternatively be categories of products. It will be appreciated that the products 365A-365C and product labels 370A-370C are examples, and that fewer or additional products, as well as additional content may be included in the GUI 350. For example, in an embodiment, the GUI 350 can include a footer having one or more hyperlinks selectable by the user to, for example, navigate to different interfaces of the retail website.

Figure 7:
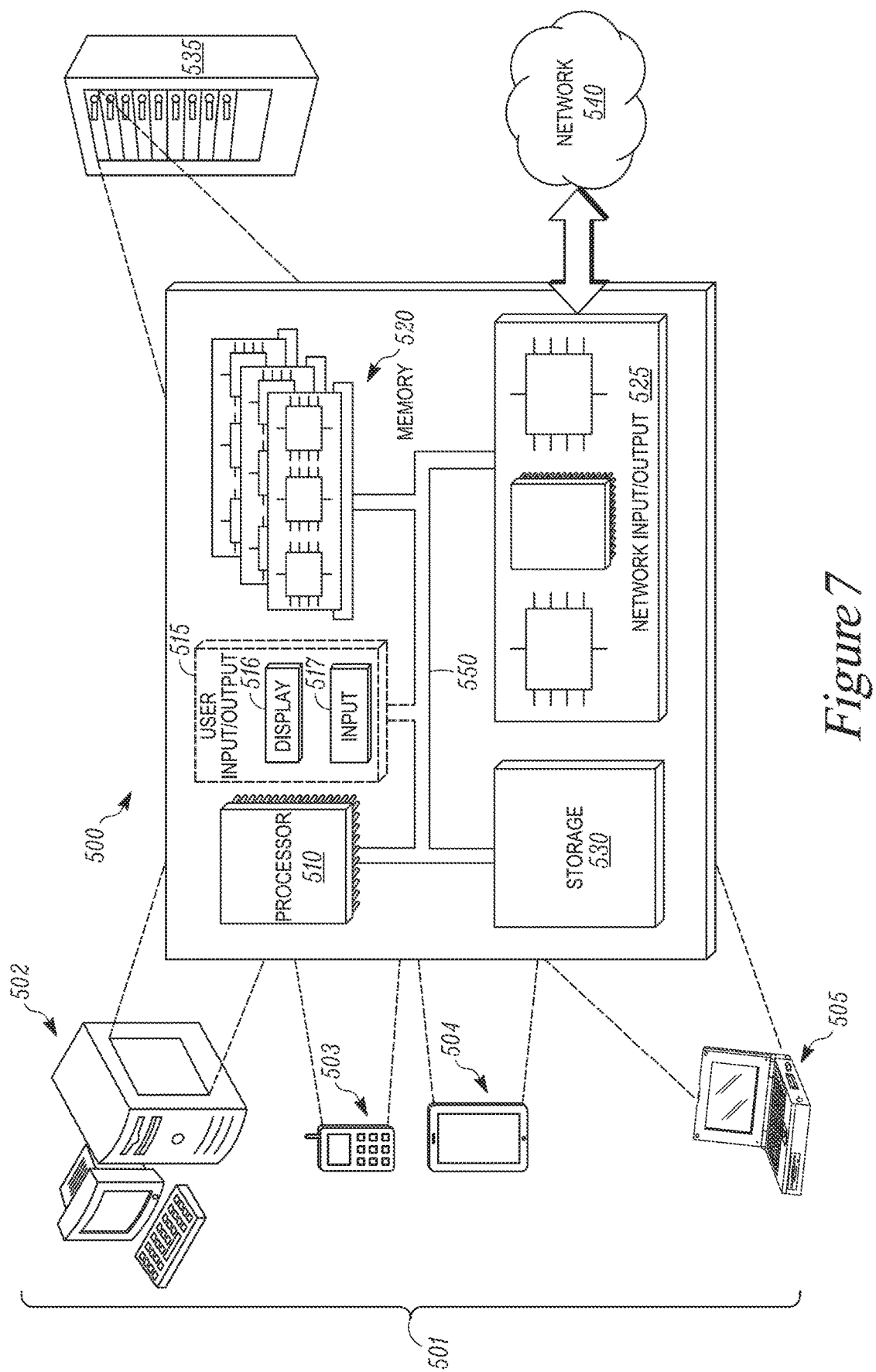
FIG. 7 is a schematic diagram of an architecture for a computer device, according to an embodiment.

FIG. 7 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or input means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

Aspects:

It is to be appreciated that any one of aspects 1-7 can be combined with any one of aspects 8-15 and/or 16-17. Any one of aspects 8-15 can be combined with any one of aspects 16-17.

Aspect 1. A computer-implemented method for correcting a spelling of a search term, the method including: extracting search information from a clickstream database, the clickstream database including search keywords which have been received by a search engine; building, by a server, a database of acceptable terms, the database of acceptable terms including search keywords from the clickstream database that match a product in a product database; building, by the server, a database of correctable terms, the database of correctable terms including search keywords from the clickstream database that do not match a product in the product database; identifying a plurality of spell correction candidates based on the search keywords included in the database of correctable terms; determining a confidence value for each of the plurality of spell correction candidates; and storing one of the plurality of spell correction candidates in the database of correctable terms, the one of the plurality of spell correction candidates being stored having a relatively highest confidence value among the confidence values for each of the plurality of spell correction candidates.

Aspect 2. The computer-implemented method according to aspect 1, wherein identifying the spell correction candidate includes: creating the spell correction candidate based on the search keywords included in the database of correctable terms, the creating including modifying up to a threshold number of characters in the search keyword included in the database of correctable terms; determining whether all spell correction candidates are created; and in response to determining that all spell correction candidates are not created, creating another spell correction candidate.

Aspect 3. The computer-implemented method according to aspect 2, further including: selecting the spell correction candidate from the plurality of spell correction candidates based on a highest confidence value relative to others of the plurality of spell correction candidates; and in response to determining the plurality of spell correction candidates have a same confidence value, determining which of the plurality of spell correction candidates have a highest ranking score in the database of acceptable terms.

Aspect 4. The computer-implemented method according to any one of aspects 1-3, wherein building the database of acceptable terms and building the database of correctable terms is performed on a periodic basis.

Aspect 5. The computer-implemented method according to any one of aspects 1-4, further including ordering the search keywords in the database of acceptable terms based on a ranking score.

Aspect 6. The computer-implemented method according to any one of aspects 1-5, further including determining a ranking score based on a weighting of actions performed as indicated in the clickstream database.

Aspect 7. The computer-implemented method according to aspect 6, wherein the confidence value is determined based on a weighting including the ranking score in the database of acceptable terms of the spell correction candidate, a length of the spell correction candidate, an edit distance of the spell correction candidate, and a value representative of a type of edit performed to obtain the spell correction candidate.

Aspect 8. A spell check system, including: a server that includes: a spell check builder that generates first and second databases that store one or more search keywords; a spell checker that, in response to receiving a search input from a user device, identifies whether the search input is in the first or the second database; and provides a search results list based on the search input.

Aspect 9. The system according to aspect 8, wherein the one or more search keywords in the first database are present in a product database.

Aspect 10. The system according to aspect 8, wherein the one or more search keywords in the second database are not present in a product database.

Aspect 11. The system according to aspect 10, wherein when the spell checker identifies that the search input matches one of the one or more search keywords in the first database, the spell checker provides the search input to a search engine, and the search engine outputs the search results list to the server.

Aspect 12. The system according to any one of aspects 10-11, wherein when the spell checker identifies that the search input matches one of the one or more search keywords in the second database, the spell checker takes an action based on an action indicator in the second database associated with the one of the one or more keywords.

Aspect 13. The system according to aspect 12, wherein the action includes correcting a spelling based on a spell correction stored in the second database associated with the one of the one or more keywords or providing a suggestion of an alternative keyword along with the search results list.

Aspect 14. The system according to any one of aspects 10-13, wherein when the spell checker identifies that the search input does not match one of the one or more search keywords in the first or the second database, the spell checker searches for a matching subset of the search input from the one or more keywords in the second database and provides a suggestion of an alternative keyword along with the search results list.

Aspect 15. The system according to any one of aspects 10-14, wherein when the spell checker identifies that the search input does not match one of the one or more search keywords in the first or the second database, the spell checker provides the search to the search engine.

Aspect 16. A spell checker, including: a spell check building means that generates a plurality of databases that store one or more keywords and statistical information associated with the one or more keywords, the plurality of databases including a database of acceptable terms including keywords which are also present in a product database and a database of correctable terms including keywords which are not present in the product database, wherein the statistical information in the database of correctable terms includes a spelling correction, a confidence value, and an action indicator.

Aspect 17. The spell checker according to aspect 16, wherein the spell check building means determines the confidence value based on search information included in a clickstream database.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

What is claimed is:

1. A computer-implemented method for correcting a spelling of a search term, the method comprising:

extracting search information from a clickstream database, the clickstream database including search keywords which have been received by a search engine;

comparing, by a server, each of the search keywords as extracted with product information in a product database to identify matching search keywords and non-matching search keywords;

storing the matching search keywords in a database of acceptable terms and the non-matching search keywords in a database of correctable terms;

calculating a ranking score for each of the matching search keywords in the database of acceptable terms, the ranking score based on a weighting of actions performed for the matching search keywords in the clickstream database;

for each of the non-matching search keywords in the database of correctable terms:

identifying a plurality of spell correction candidates;

for each of the plurality of spell correction candidates as identified, determining whether a respective spell correction candidate of the plurality of spell correction candidates is in the database of acceptable terms;

in response to determining the respective spell correction candidate is in the database of acceptable terms, determining a confidence value for the respective spell correction candidate, wherein the confidence value is determined based on a weighting using the ranking score from the database of acceptable terms for the respective spell correction candidate, a length of the respective spell correction candidate, an edit distance of the respective spell correction candidate, and a value representative of a type of edit performed to obtain the respective spell correction candidate; and storing one of the plurality of spell correction candidates in the database of correctable terms, the one of the plurality of spell correction candidates being stored having a relatively highest confidence value among the confidence values for the plurality of spell correction candidates.

2. The computer-implemented method according to claim 1, wherein identifying the plurality of spell correction candidates includes:

creating a plurality of spell corrections candidates based on the non-matching search keywords included in the database of correctable terms, the creating including modifying up to a threshold number of characters in the non-matching search keywords included in the database of correctable terms;

determining whether each of the plurality of spell correction candidates is created; and in response to determining that each of the plurality of spell correction candidates is not created, creating another spell correction candidate.

3. The computer-implemented method according to claim 2, further comprising:

selecting one of the plurality of spell correction candidates based on a highest confidence value relative to others of the plurality of spell correction candidates; and in response to determining the plurality of spell correction candidates have a same confidence value, determining which of the plurality of spell correction candidates have a highest ranking score in the database of acceptable terms.

4. The computer-implemented method according to claim 1, wherein comparing each of the search keywords as extracted with product information in a product database to identify matching search keywords and non-matching search keywords and storing the matching search keywords in a database of acceptable terms and the non-matching search keywords in a database of correctable terms are performed on a periodic basis.

5. The computer-implemented method according to claim 1, further comprising ordering the matching search keywords in the database of acceptable terms based on the ranking score.

6. The computer-implemented method according to claim 1, wherein the weighting, upon which the determining the confidence value for the respective spell correction candidate is based further includes a frequency of searching of the spell correction candidate as identified in the clickstream database.

7. The computer-implemented method according to claim 1, wherein an importance of the ranking score in the database of acceptable terms of the respective spell correction candidate, the length of the respective spell correction candidate, the edit distance of the respective spell correction candidate, and the value representative of the type of edit performed to obtain the respective spell correction candidate in the weighting is variable.

* * * * *